United States Patent
Chen et al.

(10) Patent No.: US 10,779,246 B1
(45) Date of Patent: *Sep. 15, 2020

(54) DISTRIBUTED AND DYNAMIC RXSOP ASSIGNMENT FOR WIRELESS NETWORK SERVICE ACCESS

(71) Applicant: Cisco Technology, Inc., San Jose, CA (US)

(72) Inventors: Bo Chen, San Francisco, CA (US); Apurv Bhartia, San Mateo, CA (US); Derrick Pallas, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/406,238

(22) Filed: May 8, 2019

(51) Int. Cl.
*H04W 24/02* (2009.01)
*H04W 52/18* (2009.01)
*H04W 52/36* (2009.01)
*H04W 52/24* (2009.01)
*H04B 17/318* (2015.01)

(52) U.S. Cl.
CPC ........ *H04W 52/367* (2013.01); *H04B 17/318* (2015.01); *H04W 24/02* (2013.01); *H04W 52/18* (2013.01); *H04W 52/245* (2013.01); *H04W 52/365* (2013.01)

(58) Field of Classification Search
CPC . H04W 24/02; H04W 28/08; H04W 72/0453; H04W 72/0473; H04W 88/08; H04W 52/18; H04W 84/12; H04W 48/20; H04W 52/245; H04L 5/006; H04L 43/16; H04L 43/08; H04L 43/10
USPC .......................................................... 455/522
See application file for complete search history.

(56) References Cited

U.S. PATENT DOCUMENTS 10,251,123 B2 * 4/2019 Desai .................. H04W 52/245

\* cited by examiner

*Primary Examiner* — Philip Sobutka
(74) *Attorney, Agent, or Firm* — Polsinelli PC

(57) ABSTRACT

Systems, methods, and computer-readable media for dynamically controlling an RxSOP threshold of an access point. In some examples, a current RxSOP threshold of an access point of a plurality of access points in a network environment providing wireless access to network services is determined. Wireless characteristics of one or more clients and the plurality of access points associated with the access point can be identified. Specifically, wireless characteristics of the one or more client and the plurality of access points in wirelessly providing and accessing the network services through the network environment are identified. The current RxSOP threshold of the access point can be dynamically modulated based on the wireless characteristics of the one or more clients and the plurality of access points.

20 Claims, 9 Drawing Sheets

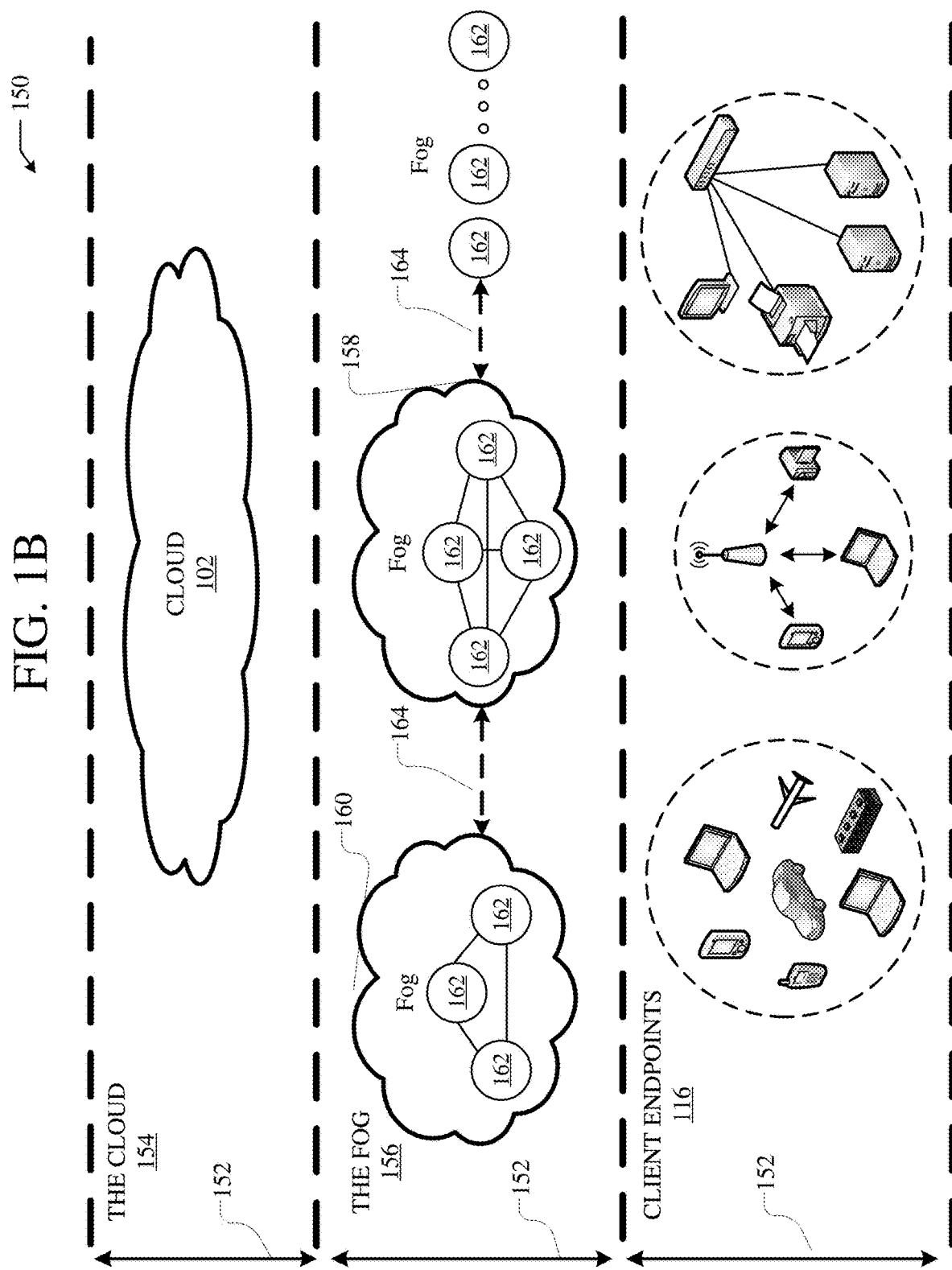

DISTRIBUTED AND DYNAMIC RXSOP ASSIGNMENT FOR WIRELESS NETWORK SERVICE ACCESS

TECHNICAL FIELD

The present technology pertains to dynamically modulating a receiver start-of-packets (RxSOP) threshold of an access point, and in particular to dynamically modulating an RxSOP threshold of an access point based on wireless characteristics of clients and access points associated with the access point in wirelessly providing and accessing network services.

BACKGROUND

The transmit power of a radio in a wireless access point (AP) is usually configured based on coverage considerations. In a network environment spanning multiple access points, it is possible that different access points operate with different transmission power. When such access points are running on the same channel, it is quite common that the access point with lower transmission power provides poor wireless network service access for a number of reasons. In particular, a biased neighbor relationship amongst access points transmitting at different transmission powers can lead to poor wireless network service access. For example, consider a network environment with two access points including a first access point transmitting at a higher power than a second access point. In the example, transmissions from the first access point can be detected by the second access point, and the first access point can fail to detect transmissions from the second access point. In turn, the first access point can assume it is the only transmitter in the network environment and continue to transmit on the medium, while the second access point is unable to pass any traffic on the medium. Specifically, since the second access point always senses the medium as busy, due to the first access point's continuous activity, the second access point can refrain from transmitting over the medium in the wireless network. Accordingly unfair sharing of the wireless medium occurs, potentially leading to failed transmissions for clients through the second access point. This problem is especially prevalent in high density deployments, e.g. stadiums, where a large number of access points are implemented to provide network services to a large number of clients.

In order to solve the problem of a biased relationship, e.g. transmission relationship, amongst access points in a network environment, RxSOP thresholds of the access points can be adjusted for wirelessly providing network services to clients. An RxSOP threshold of an access point, as used herein, is a threshold used by the access point to determine whether to decode received packets and subsequently decode the received packets. Specifically, an access point can be configured to only decode packets that are received at a reception power greater than an RxSOP threshold of the access point. With respect to the previously described situation of the biased relationship amongst access points, RxSOP thresholds of the access points can be used to solve, at least in the part, the problems created by the biased relationship in wirelessly providing network services. Specifically, an RxSOP threshold of the second access point can be increased to make the second access point less sensitive to transmissions made by the first access point. For example, the RxSOP threshold of the second access point can be increased above a reception level of at least a portion of the transmissions made by the first access point. In turn, the second access point will ignore these transmissions from the first access point and proceed with making its own transmissions over the wireless medium shared with the first access point in order to provide access to network services.

While adjusting an RxSOP threshold can solve the problems created by a biased relationship of access points, RxSOP threshold adjustment is a technique that should be implemented carefully. In particular, tuning RxSOP thresholds in a network environment that includes multiple access points is difficult to perform at scale. There therefore exist needs for systems and methods for dynamically adjusting an RxSOP threshold of an access point, e.g. in a network environment with a large number of access points, while mitigating or limiting harmful effects of the RxSOP threshold on providing network services through the network environment. In particular, there exist needs for systems and methods for dynamically adjusting an RxSOP threshold of an access point in a network environment while increasing or maximizing throughput performance within the network environment.

Specifically, RxSOP threshold adjustment can adversely affect network coverage and the overall experience in providing network services. In particular, RxSOP threshold adjustment can lead to inadvertent disassociation of clients from an access point. For example, an RxSOP threshold of an access point can be increased to the point where the access point fails to decode packets received from a client, e.g. not hear the client. As a result, the access point can fail to provide network service access to the client, even though the client is in range of the access point. There therefore exist needs for systems and methods for dynamically adjusting an RxSOP threshold of an access point while still providing network service access to all or a large number of clients within range of the access point.

Further, RxSOP threshold adjustment can adversely affect network coverage by further creating a biased relationship amongst access points, thereby leading to starved access points. For example, an RxSOP threshold of an access point can be increased to the point where the access point fails to decode packets received from a neighboring access point on a shared wireless medium, e.g. not hear the neighboring access point. In turn, the access point can assume that it is the only access point with traffic and proceed to flood the shared wireless medium with its own traffic. This can preventing the neighboring access point from using the shared wireless medium to transmits its own traffic, thereby creating a starved neighboring access point. In turn, this can degrade network performance for clients using the neighboring access point to access network services. There therefore exist needs for systems and methods for dynamically adjusting an RxSOP threshold of an access point while still allowing the access point to detect transmissions from neighboring access points.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 1B illustrates an example fog computing architecture;

DESCRIPTION OF EXAMPLE EMBODIMENTS

Figure 1A:
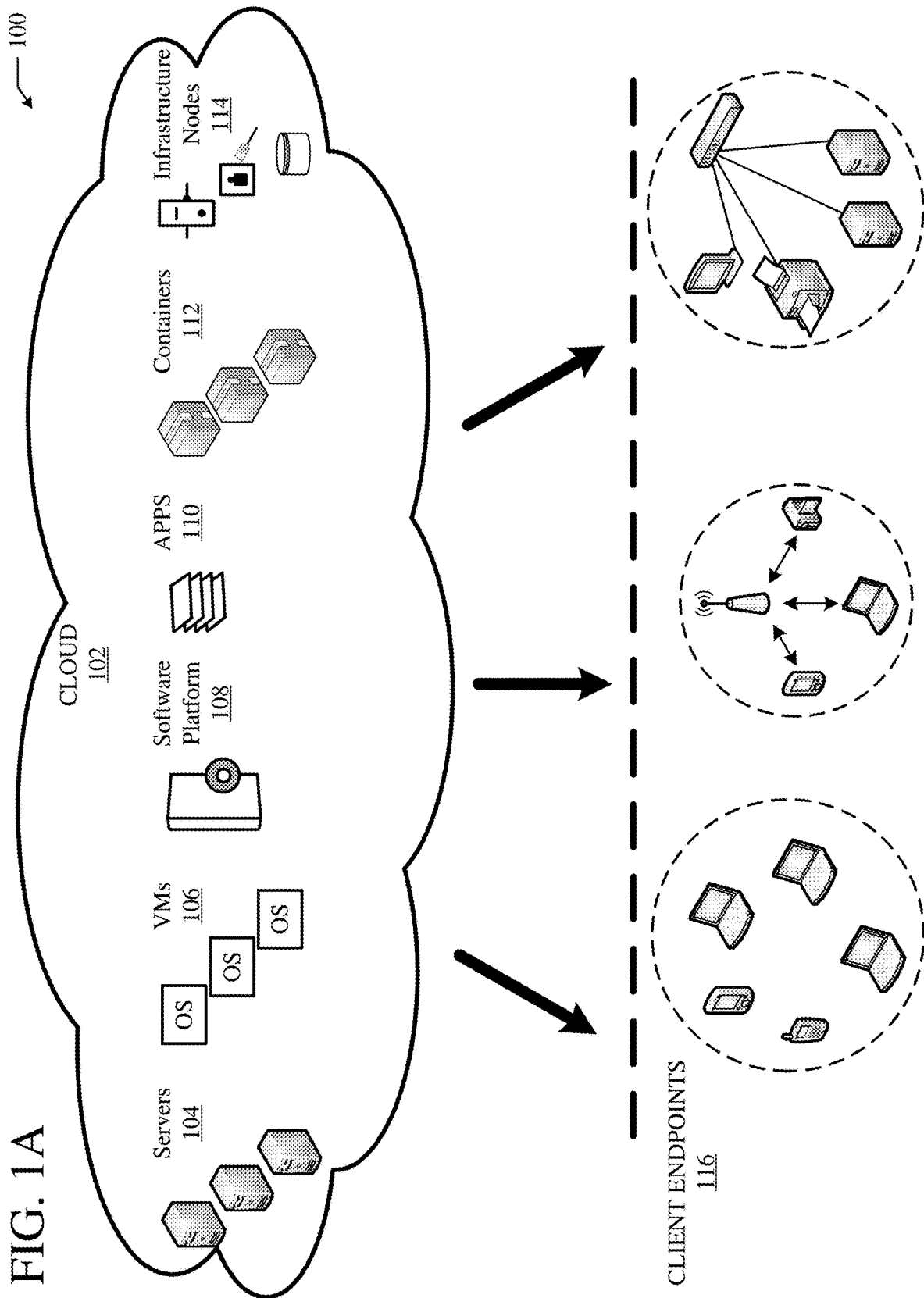
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

A method can include determining a current RxSOP threshold of an access point of a plurality of access points in a network environment providing wireless access to network services. Wireless characteristics of one or more clients and the plurality of access points associated with the access point can be identified. Specifically, wireless characteristics of the one or more clients and the plurality of access points in providing and accessing the network services through the network environment can be identified. The current RxSOP threshold of the access points can be dynamically modulated based on the wireless characteristics of the one or more clients and the plurality of access points.

A system can include one or more processors and at least one computer-readable storage medium storing instructions which, when executed by the one or more processors, cause the one or more processors to determine a current RxSOP threshold of an access point of a plurality of access points in a network environment providing wireless access to network services. The instructions can also cause the one or more processors to identify wireless characteristics of one or more clients and the plurality of access points associated with the access point in wirelessly providing and accessing network services through the network environment. Further, the instructions can cause the one or more processors to set a target RxSOP threshold of the access point based on the wireless characteristics of the one or more clients and the plurality of access points. As follows, the instructions can cause the one or more processors to dynamically modulate the current RxSOP threshold of the access point based on the target RxSOP threshold.

A non-transitory computer-readable storage medium having stored therein instructions which, when executed by a processor, cause the processor to determine a current RxSOP threshold of an access point of a plurality of access points in a network environment providing wireless access to network services. The instructions can also cause the processor to identify, by the access point, wireless characteristics of one or more clients and the plurality of access points associated with the access point. Specifically, the instructions can cause the processor to identify, by the access point, wireless characteristics of the one or more clients and the plurality of access points in providing and accessing the network services through the network environment. Further, the instructions can cause the processor to dynamically modulate, by the access point, the current RxSOP threshold of the access point based on the wireless characteristics of the one or more clients and the plurality of access points.

DESCRIPTION

The disclosed technology addresses the need in the art for mechanisms for dynamically modulating an RxSOP threshold of an access point, and in particular to dynamically modulating an RxSOP threshold of an access point while still providing network service access to all or a large number of clients within range of the access point and also while still allowing the access point to detect transmissions from neighboring access points. The present technology involves system, methods, and computer-readable media for dynamically modulating an RxSOP threshold of an access point. Further, the present technology involves systems, methods, and computer-readable media for dynamically modulating an RxSOP threshold of an access point based on wireless characteristics of client and access points associated with the access point in providing and accessing network services.

Figure 4:
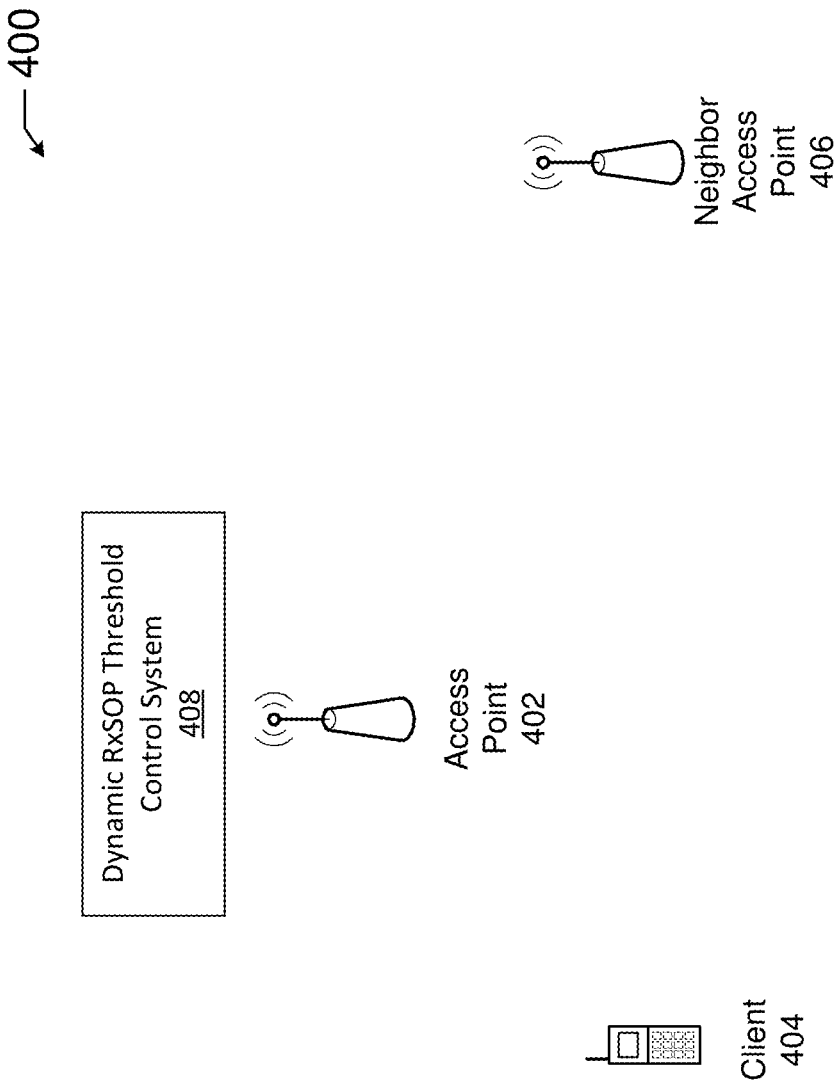
FIG. 4 illustrates an example network environment for dynamically modulating RxSOP thresholds of access points in the environment.
Figure 5:
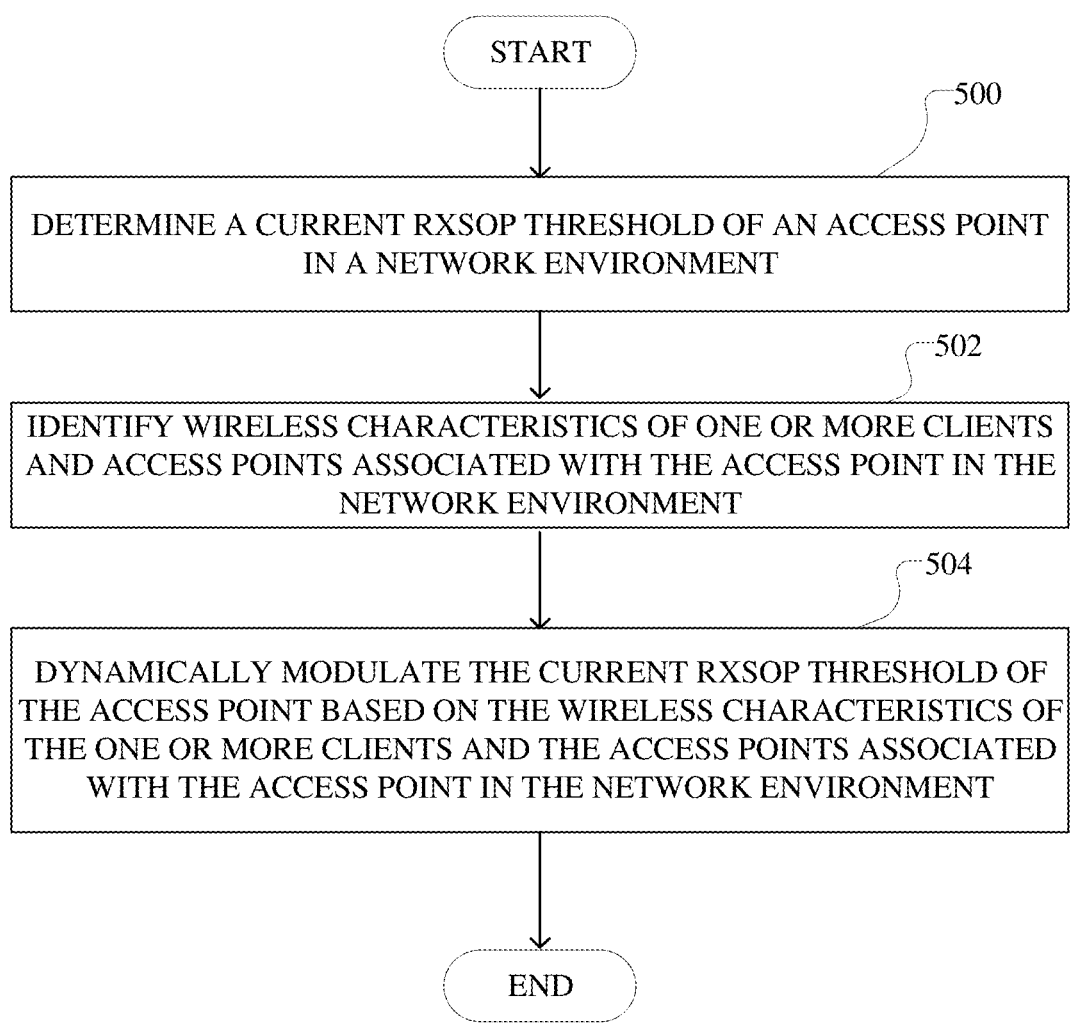
FIG. 5 illustrates a flowchart for an example method of dynamically modulating an RxSOP threshold of an access point based on wireless characteristics of clients and access points associated with the access point.
Figure 6:
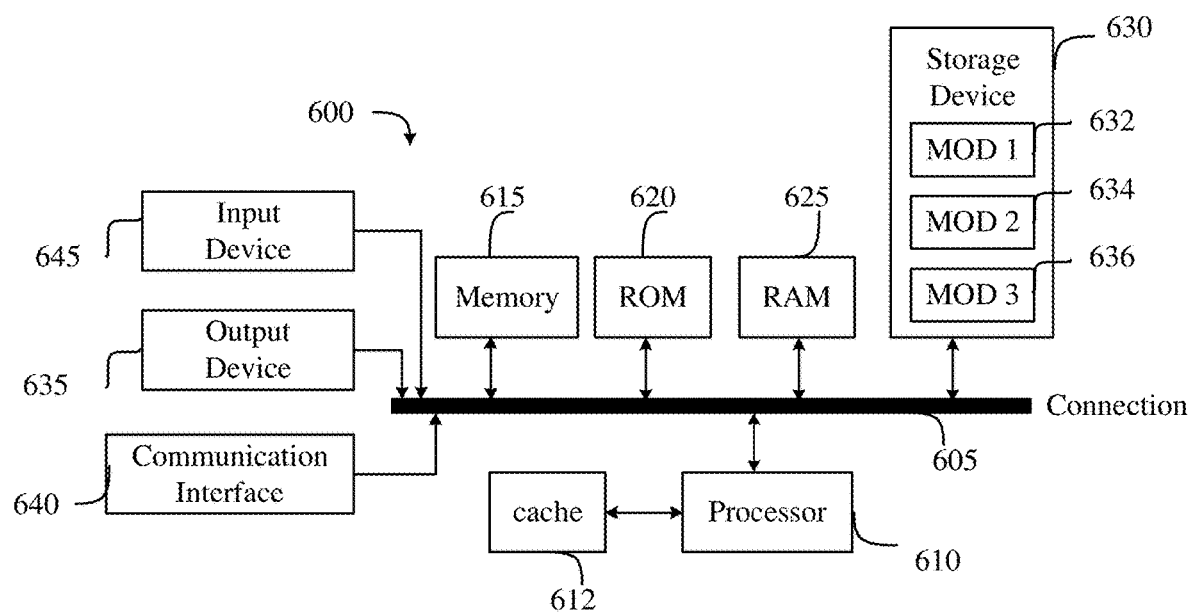
FIG. 6 illustrates an example computing system.
Figure 7:
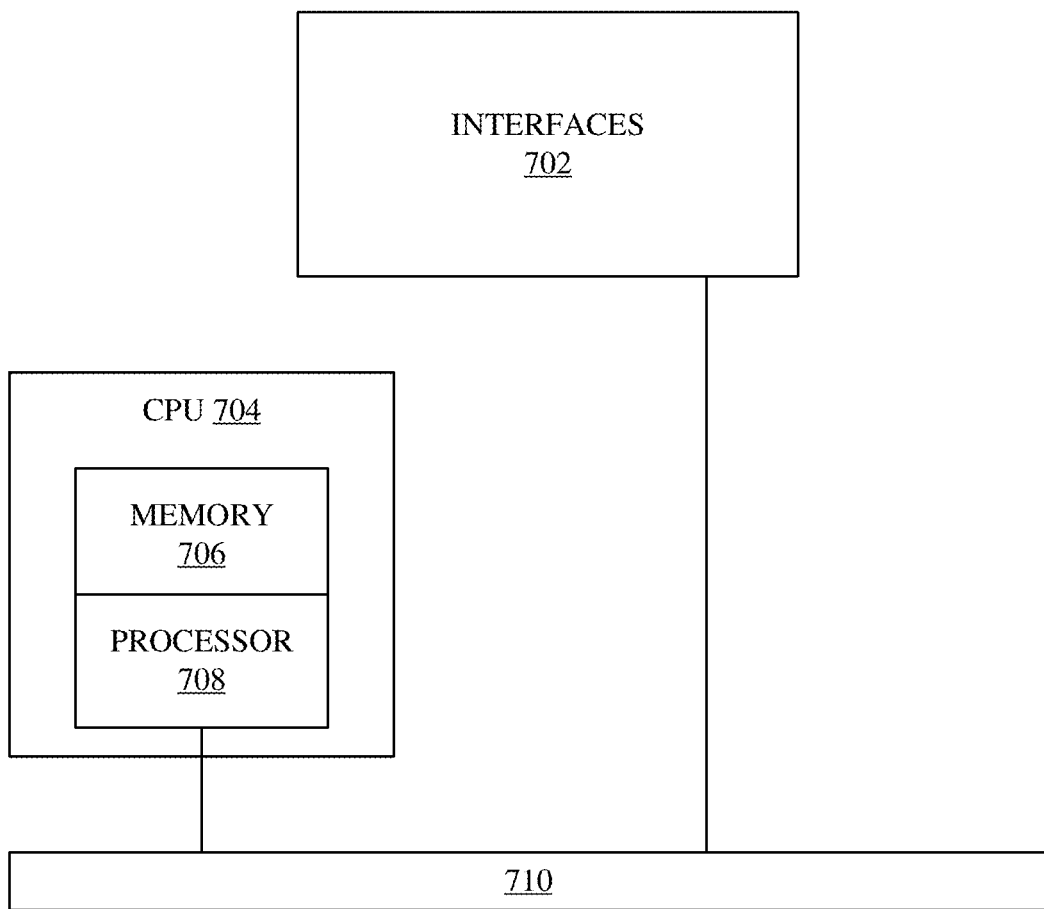
FIG. 7 illustrates an example network device.

A description of network environments and architectures for network data access and services, as illustrated in FIGS. 1A, 1B, 2A, 2B, and 3 is first disclosed herein. A discussion of systems and methods dynamically modulating an RxSOP threshold of an access point, as shown in FIGS. 4 and 5, will then follow. The discussion then concludes with a brief description of example devices, as illustrated in FIGS. 6 and 7. These variations shall be described herein as the various embodiments are set forth. The disclosure now turns to FIG. 1A.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

FIG. 1B illustrates a diagram of an example fog computing architecture 150. The fog computing architecture can be used to form part of a TCP connection or otherwise be accessed through the TCP connection. Specifically, the fog computing architecture can include an initiator or a receiver of a TCP connection and be utilized by the initiator or the receiver to transmit and/or receive data through the TCP connection. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 158 can be local or regional clouds or networks. For example, the fog instances 156, 158 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 2A:
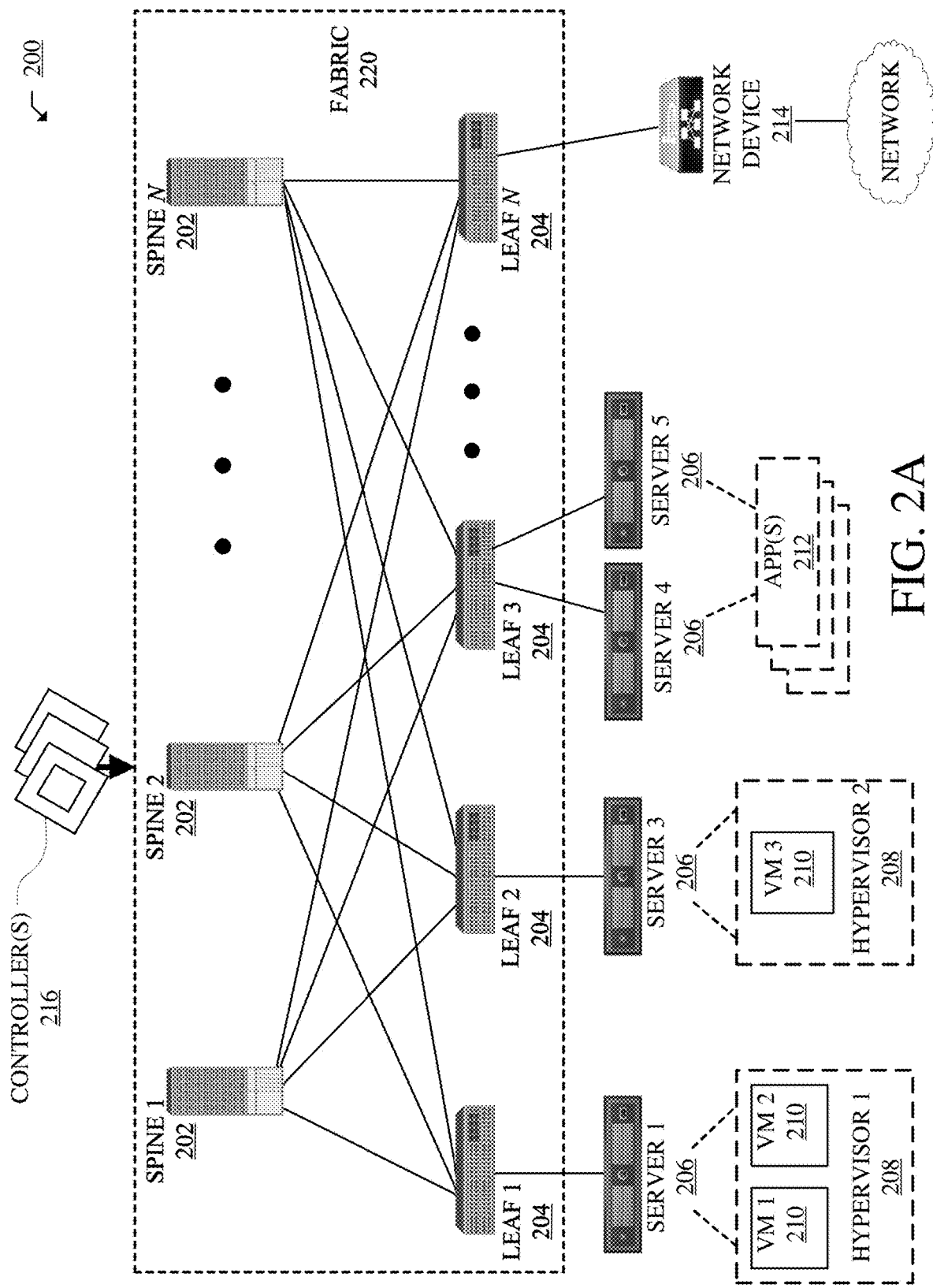
FIG. 2A illustrates a diagram of an example network environment, such as a data center.

FIG. 2A illustrates a diagram of an example Network Environment 200, such as a data center. In some cases, the Network Environment 200 can include a data center, which can support and/or host the cloud 102. The Network Environment 200 can include a Fabric 220 which can represent the physical layer or infrastructure (e.g., underlay) of the Network Environment 200. Fabric 220 can include Spines 202 (e.g., spine routers or switches) and Leafs 204 (e.g., leaf routers or switches) which can be interconnected for routing or switching traffic in the Fabric 220. Spines 202 can interconnect Leafs 204 in the Fabric 220, and Leafs 204 can connect the Fabric 220 to an overlay or logical portion of the Network Environment 200, which can include application services, servers, virtual machines, containers, endpoints, etc. Thus, network connectivity in the Fabric 220 can flow from Spines 202 to Leafs 204, and vice versa. The interconnections between Leafs 204 and Spines 202 can be redundant (e.g., multiple interconnections) to avoid a failure in routing. In some embodiments, Leafs 204 and Spines 202 can be fully connected, such that any given Leaf is connected to each of the Spines 202, and any given Spine is connected to each of the Leafs 204. Leafs 204 can be, for example, top-of-rack ("ToR") switches, aggregation switches, gateways, ingress and/or egress switches, provider edge devices, and/or any other type of routing or switching device.

Leafs 204 can be responsible for routing and/or bridging tenant or customer packets and applying network policies or rules. Network policies and rules can be driven by one or more Controllers 216, and/or implemented or enforced by one or more devices, such as Leafs 204. Leafs 204 can connect other elements to the Fabric 220. For example, Leafs 204 can connect Servers 206, Hypervisors 208, Virtual Machines (VMs) 210, Applications 212, Network Device 214, etc., with Fabric 220. Such elements can reside in one or more logical or virtual layers or networks, such as an overlay network. In some cases, Leafs 204 can encapsulate and decapsulate packets to and from such elements (e.g., Servers 206) in order to enable communications throughout Network Environment 200 and Fabric 220. Leafs 204 can also provide any other devices, services, tenants, or workloads with access to Fabric 220. In some cases, Servers 206 connected to Leafs 204 can similarly encapsulate and decapsulate packets to and from Leafs 204. For example, Servers 206 can include one or more virtual switches or routers or tunnel endpoints for tunneling packets between an overlay or logical layer hosted by, or connected to, Servers 206 and an underlay layer represented by Fabric 220 and accessed via Leafs 204.

Applications 212 can include software applications, services, containers, appliances, functions, service chains, etc. For example, Applications 212 can include a firewall, a database, a CDN server, an IDS/IPS, a deep packet inspection service, a message router, a virtual switch, etc. An application from Applications 212 can be distributed, chained, or hosted by multiple endpoints (e.g., Servers 206, VMs 210, etc.), or may run or execute entirely from a single endpoint.

VMs 210 can be virtual machines hosted by Hypervisors 208 or virtual machine managers running on Servers 206. VMs 210 can include workloads running on a guest operating system on a respective server. Hypervisors 208 can provide a layer of software, firmware, and/or hardware that creates, manages, and/or runs the VMs 210. Hypervisors 208 can allow VMs 210 to share hardware resources on Servers 206, and the hardware resources on Servers 206 to appear as multiple, separate hardware platforms. Moreover, Hypervisors 208 on Servers 206 can host one or more VMs 210.

In some cases, VMs 210 and/or Hypervisors 208 can be migrated to other Servers 206. Servers 206 can similarly be migrated to other locations in Network Environment 200. For example, a server connected to a specific leaf can be changed to connect to a different or additional leaf. Such configuration or deployment changes can involve modifications to settings, configurations and policies that are applied to the resources being migrated as well as other network components.

In some cases, one or more Servers 206, Hypervisors 208, and/or VMs 210 can represent or reside in a tenant or customer space. Tenant space can include workloads, services, applications, devices, networks, and/or resources that are associated with one or more clients or subscribers. Accordingly, traffic in Network Environment 200 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, security and configuration information between tenants can be managed by Controllers 216, Servers 206, Leafs 204, etc.

Configurations in Network Environment 200 can be implemented at a logical level, a hardware level (e.g., physical), and/or both. For example, configurations can be implemented at a logical and/or hardware level based on endpoint or resource attributes, such as endpoint types and/or application groups or profiles, through a software-defined network (SDN) framework (e.g., Application-Centric Infrastructure (ACI) or VMWARE NSX). To illustrate, one or more administrators can define configurations at a logical level (e.g., application or software level) through Controllers 216, which can implement or propagate such configurations through Network Environment 200. In some examples, Controllers 216 can be Application Policy Infrastructure Controllers (APICs) in an ACI framework. In other examples, Controllers 216 can be one or more management components for associated with other SDN solutions, such as NSX Managers.

Such configurations can define rules, policies, priorities, protocols, attributes, objects, etc., for routing and/or classifying traffic in Network Environment 200. For example, such configurations can define attributes and objects for classifying and processing traffic based on Endpoint Groups (EPGs), Security Groups (SGs), VM types, bridge domains (BDs), virtual routing and forwarding instances (VRFs), tenants, priorities, firewall rules, etc. Other example network objects and configurations are further described below. Traffic policies and rules can be enforced based on tags, attributes, or other characteristics of the traffic, such as protocols associated with the traffic, EPGs associated with the traffic, SGs associated with the traffic, network address information associated with the traffic, etc. Such policies and rules can be enforced by one or more elements in Network Environment 200, such as Leafs 204, Servers 206, Hypervisors 208, Controllers 216, etc. As previously explained, Network Environment 200 can be configured according to one or more particular software-defined network (SDN) solutions, such as CISCO ACI or VMWARE NSX. These example SDN solutions are briefly described below.

ACI can provide an application-centric or policy-based solution through scalable distributed enforcement. ACI supports integration of physical and virtual environments under a declarative configuration model for networks, servers, services, security, requirements, etc. For example, the ACI framework implements EPGs, which can include a collection of endpoints or applications that share common configuration requirements, such as security, QoS, services, etc. Endpoints can be virtual/logical or physical devices, such as VMs, containers, hosts, or physical servers that are connected to Network Environment 200. Endpoints can have one or more attributes such as a VM name, guest OS name, a security tag, application profile, etc. Application configurations can be applied between EPGs, instead of endpoints directly, in the form of contracts. Leafs 204 can classify incoming traffic into different EPGs. The classification can be based on, for example, a network segment identifier such as a VLAN ID, VXLAN Network Identifier (VNID), NVGRE Virtual Subnet Identifier (VSID), MAC address, IP address, etc.

In some cases, classification in the ACI infrastructure can be implemented by Application Virtual Switches (AVS), which can run on a host, such as a server or switch. For example, an AVS can classify traffic based on specified attributes, and tag packets of different attribute EPGs with different identifiers, such as network segment identifiers (e.g., VLAN ID). Finally, Leafs 204 can tie packets with their attribute EPGs based on their identifiers and enforce policies, which can be implemented and/or managed by one or more Controllers 216. Leaf 204 can classify to which EPG the traffic from a host belongs and enforce policies accordingly.

Another example SDN solution is based on VMWARE NSX. With VMWARE NSX, hosts can run a distributed firewall (DFW) which can classify and process traffic. Consider a case where three types of VMs, namely, application, database and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, database VMs). DFW rules can be configured to implement policies for the specific security groups. To illustrate, in the context of the previous example, DFW rules can be configured to block HTTP traffic between web, application, and database security groups.

Returning now to FIG. 2A, Network Environment 200 can deploy different hosts via Leafs 204, Servers 206, Hypervisors 208, VMs 210, Applications 212, and Controllers 216, such as VMWARE ESXi hosts, WINDOWS HYPER-V hosts, bare metal physical hosts, etc. Network Environment 200 may interoperate with a variety of Hypervisors 208, Servers 206 (e.g., physical and/or virtual servers), SDN orchestration platforms, etc. Network Environment 200 may implement a declarative model to allow its integration with application design and holistic network policy.

Controllers 216 can provide centralized access to fabric information, application configuration, resource configuration, application-level configuration modeling for a software-defined network (SDN) infrastructure, integration with management systems or servers, etc. Controllers 216 can form a control plane that interfaces with an application plane via northbound APIs and a data plane via southbound APIs.

As previously noted, Controllers 216 can define and manage application-level model(s) for configurations in Network Environment 200. In some cases, application or device configurations can also be managed and/or defined by other components in the network. For example, a hypervisor or virtual appliance, such as a VM or container, can run a server or management tool to manage software and services in Network Environment 200, including configurations and settings for virtual appliances.

As illustrated above, Network Environment 200 can include one or more different types of SDN solutions, hosts, etc. For the sake of clarity and explanation purposes, various examples in the disclosure will be described with reference to an ACI framework, and Controllers 216 may be interchangeably referenced as controllers, APICs, or APIC controllers. However, it should be noted that the technologies and concepts herein are not limited to ACI solutions and may be implemented in other architectures and scenarios, including other SDN solutions as well as other types of networks which may not deploy an SDN solution.

Further, as referenced herein, the term "hosts" can refer to Servers 206 (e.g., physical or logical), Hypervisors 208, VMs 210, containers (e.g., Applications 212), etc., and can run or include any type of server or application solution. Non-limiting examples of "hosts" can include virtual switches or routers, such as distributed virtual switches (DVS), application virtual switches (AVS), vector packet processing (VPP) switches; VCENTER and NSX MANAGERS; bare metal physical hosts; HYPER-V hosts; VMs; DOCKER Containers; etc.

Figure 2B:
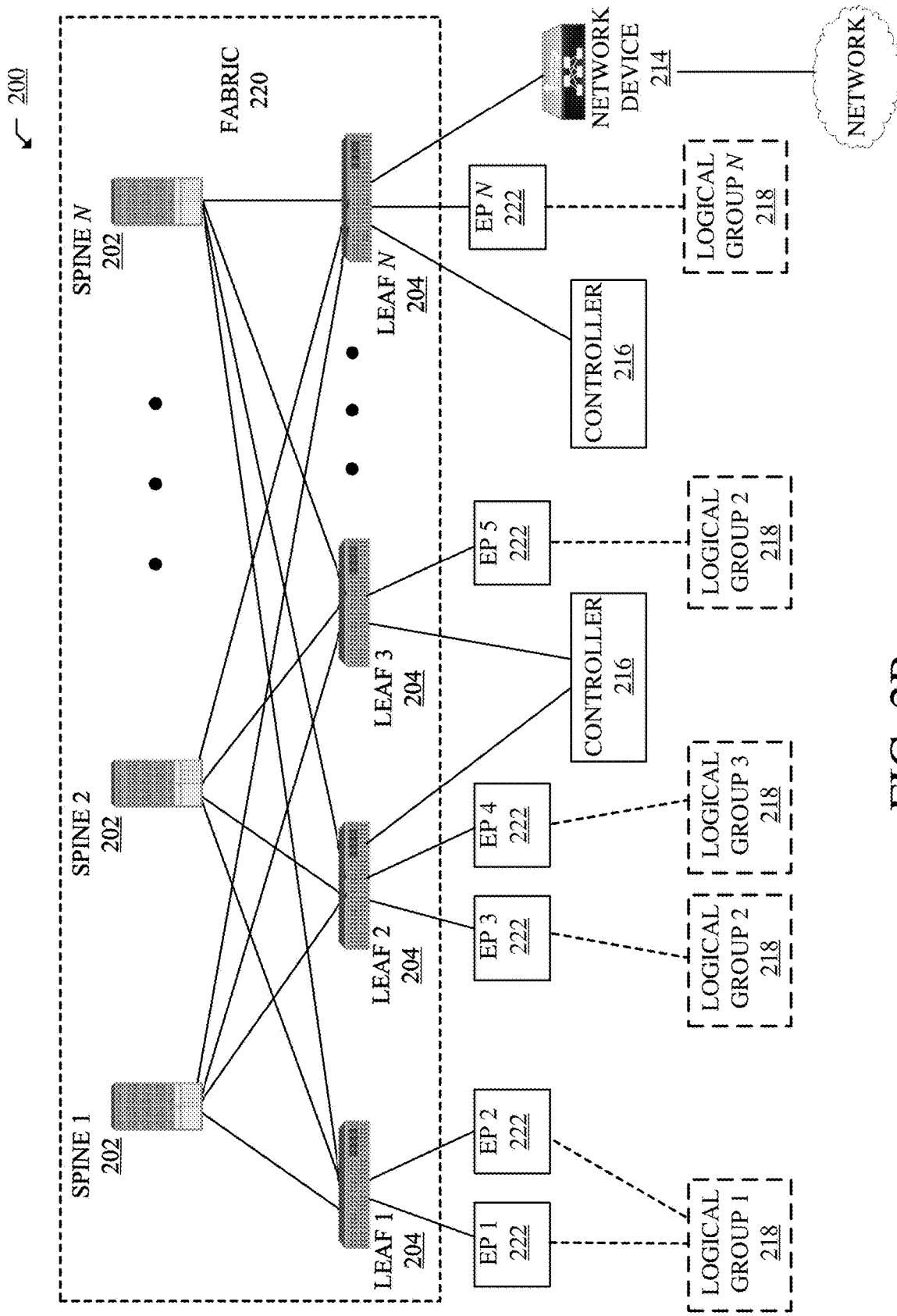
FIG. 2B illustrates another example of a network environment.

FIG. 2B illustrates another example of Network Environment 200. In this example, Network Environment 200 includes Endpoints 222 connected to Leafs 204 in Fabric 220. Endpoints 222 can be physical and/or logical or virtual entities, such as servers, clients, VMs, hypervisors, software containers, applications, resources, network devices, workloads, etc. For example, an Endpoint 222 can be an object that represents a physical device (e.g., server, client, switch, etc.), an application (e.g., web application, database application, etc.), a logical or virtual resource (e.g., a virtual switch, a virtual service appliance, a virtualized network function (VNF), a VM, a service chain, etc.), a container running a software resource (e.g., an application, an appliance, a VNF, a service chain, etc.), storage, a workload or workload engine, etc. Endpoints 122 can have an address (e.g., an identity), a location (e.g., host, network segment, virtual routing and forwarding (VRF) instance, domain, etc.), one or more attributes (e.g., name, type, version, patch level, OS name, OS type, etc.), a tag (e.g., security tag), a profile, etc.

Endpoints 222 can be associated with respective Logical Groups 218. Logical Groups 218 can be logical entities containing endpoints (physical and/or logical or virtual) grouped together according to one or more attributes, such as endpoint type (e.g., VM type, workload type, application type, etc.), one or more requirements (e.g., policy requirements, security requirements, QoS requirements, customer requirements, resource requirements, etc.), a resource name (e.g., VM name, application name, etc.), a profile, platform or operating system (OS) characteristics (e.g., OS type or name including guest and/or host OS, etc.), an associated network or tenant, one or more policies, a tag, etc. For example, a logical group can be an object representing a collection of endpoints grouped together. To illustrate, Logical Group 1 can contain client endpoints, Logical Group 2 can contain web server endpoints, Logical Group 3 can contain application server endpoints, Logical Group N can contain database server endpoints, etc. In some examples, Logical Groups 218 are EPGs in an ACI environment and/or other logical groups (e.g., SGs) in another SDN environment.

Traffic to and/or from Endpoints 222 can be classified, processed, managed, etc., based Logical Groups 218. For example, Logical Groups 218 can be used to classify traffic to or from Endpoints 222, apply policies to traffic to or from Endpoints 222, define relationships between Endpoints 222, define roles of Endpoints 222 (e.g., whether an endpoint consumes or provides a service, etc.), apply rules to traffic to or from Endpoints 222, apply filters or access control lists (ACLs) to traffic to or from Endpoints 222, define communication paths for traffic to or from Endpoints 222, enforce requirements associated with Endpoints 222, implement security and other configurations associated with Endpoints 222, etc.

In an ACI environment, Logical Groups 218 can be EPGs used to define contracts in the ACI. Contracts can include rules specifying what and how communications between EPGs take place. For example, a contract can define what provides a service, what consumes a service, and what policy objects are related to that consumption relationship. A contract can include a policy that defines the communication path and all related elements of a communication or relationship between endpoints or EPGs. For example, a Web EPG can provide a service that a Client EPG consumes, and that consumption can be subject to a filter (ACL) and a service graph that includes one or more services, such as firewall inspection services and server load balancing.

Figure 3:
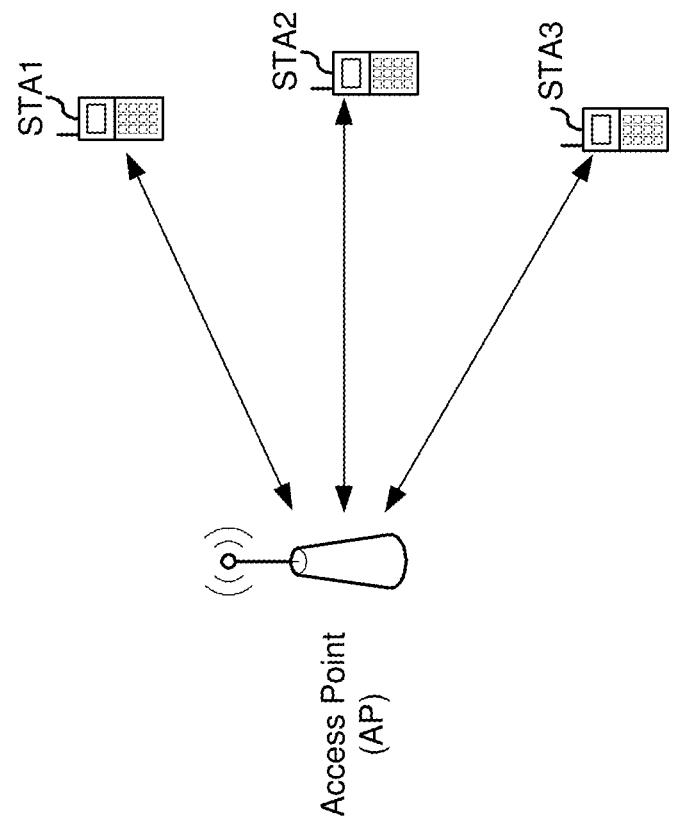
FIG. 3 illustrates an example wireless communication network.

FIG. 3 illustrates an example wireless communication network 300 in which some aspects of the technology can be implemented. Specifically, the wireless communication network 300 can form, at least in part, a TCP connection and include an initiator and/or receiver in a TCP connection. Correspondingly, the wireless communication network 300 can be used to transmit data through the TCP connection.

FIG. 3 illustrates an Access Point (AP), configured for wireless communication with multiple receivers or client devices (e.g., STA1, STA2, and STA3). It is understood that additional (or fewer) STAs and/or APs could be implemented in network 300, without departing from the scope of the technology.

The AP may have access or interface to a Distribution System (DS) or another type of wired/wireless network that may carry traffic in and out of a BSS (not illustrated). Thus traffic to STAs can originate from outside the BSS, and arrive through the AP for delivery to the STAs. Conversely, traffic originating from STAs to destinations outside the BSS can be sent to the AP to be delivered to the respective destinations. Traffic between STAs within the BSS can be sent through the AP where the source STA may send traffic to the AP and the AP may deliver the traffic to the destination STA. The traffic between STAs within a BSS may be peer-to-peer traffic.

Using the IEEE 802.11 infrastructure mode of operation, the AP can transmit on a fixed channel, for example that is 20 MHz wide, and designated as the operating channel of the BSS. This channel may also be used by the STAs to establish a connection with the AP. The channel access in an IEEE 802.11 system may be Carrier Sense Multiple Access with Collision Avoidance (CSMA/CA). In this mode of operation, the STAs, including the AP, can sense the primary channel. If the channel is detected to be busy, the STA may back off. If the channel is detected to be free, the STA may acquire the channel and transmit data.

It is understood that network 300 can implement various wireless standards using different channel sizes (bandwidths), without departing from the technology. By way of example, IEEE 802.11n, High Throughput (HT) STAs may be used, e.g., implementing a 40 MHz communication channel. This can be achieved, for example, by combining a primary 20 MHz channel, with an adjacent 20 MHz channel to form a 40 MHz wide contiguous channel. In IEEE 802.11a/c, very high throughput (VHT) STAB can also be supported, e.g., 20 MHz, 40 MHz, 80 MHz, and/or 160 MHz wide channels. The 40 MHz, and 80 MHz, channels can be formed, e.g., by combining contiguous 20 MHz channels. A 160 MHz channel may be formed, for example, by combining eight contiguous 20 MHz channels, or by combining two non-contiguous 80 MHz channels (e.g., referred to as an 80+80 configuration).

The transmit power of a radio in a wireless access point is usually configured based on coverage considerations. In a network environment spanning multiple access points, it is possible that different access points operate with different transmission power. When such access points are running on the same channel, it is quite common that the access point with lower transmission power provides poor wireless network service access for a number of reasons. In particular, a biased neighbor relationship amongst access points transmitting at different transmission powers can lead to poor wireless network service access. For example, consider a network environment with two access points including a first access point transmitting at a higher power than a second access point. In the example, transmissions from the first access point can be detected by the second access point, and the first access point can fail to detect transmissions from the second access point. In turn, the first access point can assume it is the only transmitter in the network environment and continue to transmit on the medium, while the second access point is unable to pass any traffic on the medium. Specifically, since the second access point always senses the medium as busy, due to the first access point's continuous activity, the second access point can refrain from transmitting over the medium in the wireless network. Accordingly unfair sharing of the wireless medium occurs, potentially leading to failed transmissions for clients through the second access point. This problem is especially prevalent in high density deployments, e.g. stadiums, where a large number of access points are implemented to provide network services to a large number of clients.

In order to solve the problem of a biased relationship, e.g. transmission relationship, amongst access points in a network environment, RxSOP thresholds of the access points can be adjusted for wirelessly providing network services to clients. An RxSOP threshold of an access point, as used herein, is a threshold used by the access point to determine whether to decode received packets and subsequently decode the received packets. Specifically, an access point can be configured to only decode packets that are received at a reception power greater than an RxSOP threshold of the access point. With respect to the previously described situation of the biased relationship amongst access points, RxSOP thresholds of the access points can be used to solve, at least in the part, the problems created by the biased relationship in wirelessly providing network service access. Specifically, an RxSOP threshold of the second access point can be increased to make the second access point less sensitive to transmissions made by the first access point. For example, the RxSOP threshold of the second access point can be increased above a reception level of at least a portion of the transmissions made by the first access point. In turn, the second access point will ignore these transmissions from the first access point and proceed with making its own transmissions over the wireless medium shared with the first access point in order to provide access to network services.

While adjusting an RxSOP threshold can solve the problems created by a biased relationship of access points, RxSOP threshold adjustment is a technique that should be implemented carefully. In particular, tuning RxSOP thresholds in a network environment that includes multiple access points is difficult to perform at scale.

Specifically, RxSOP threshold adjustment can adversely affect network coverage and the overall experience in providing network services to clients. In particular, RxSOP threshold adjustment can lead to inadvertent disassociation of clients from an access point. For example, an RxSOP threshold of an access point can be increased to the point where the access point fails to decode packets received from a client, e.g. not hear the client. As a result, the access point can fail to provide network services to the client, even though the client is in range of the access point.

Further, RxSOP threshold adjustment can adversely affect network coverage by further creating a biased relationship amongst access points, thereby leading to starved access points. For example, an RxSOP threshold of an access point can be increased to the point where the access point fails to decode packets received from a neighboring access point on a shared wireless medium, e.g. not hear the neighboring access point. In turn, the access point can assume that it is the only access point with traffic and proceed to flood the shared wireless medium with its own traffic. This can preventing the neighboring access point from using the shared wireless medium to transmits its own traffic, thereby creating a starved neighboring access point. In turn, this can degrade network performance for clients using the neighboring access point to access network services.

The present includes systems, methods, and computer-readable media for dynamically modulating an RxSOP threshold of an access point. Specifically, a current RxSOP threshold of an access point of a plurality of access points in a network environment providing wireless access to network services can be determined. Wireless characteristics of one or more clients and the plurality of access points associated with the access point can be identified. Specifically, wireless characteristics of the one or more clients and the plurality of access points in providing and accessing the network services through the network environment can be identified. The current RxSOP threshold of the access points can be dynamically modulated based on the wireless characteristics of the one or more clients and the plurality of access points. In particular, a target RxSOP threshold of the access point can be set based on the wireless characteristics, and the current RxSOP threshold of the access point can be dynamically modulated based on the target RxSOP. The access point, itself, can perform one or an applicable combination of these functions in order to dynamically modulate the current RxSOP threshold of the access point.

FIG. 4 illustrates an example network environment 400 for dynamically modulating RxSOP thresholds of access points in the environment 400. As will be discussed in greater detail later, the network environment 400 can be used to dynamically modulate RxSOP thresholds of access points in the environment to in order to improve performance in wirelessly providing network services to the clients through the access points.

The network environment 400 can be implemented with an applicable network environment for providing network services to clients. For example, the network environment 400 can be implemented with the network environments 200 shown in FIGS. 2A and 2B to provide network services to clients.

The example network environment 400 shown in FIG. 4 includes an access point 402, a client 404, a neighbor access point 406, and a dynamic RxSOP threshold control system 408. The neighbor access point 406 can be a neighbor, e.g. a physical neighbor, to the access point 402 in the network environment 400. Further, the access point 402 and the neighbor access point 406 function to provide wireless access to network services according to an applicable access point, such as the access point described with respect to the network 300 shown in FIG. 3. In particular, the access point 402 and the neighbor access point 406 can function according to an applicable wireless protocol, e.g. the IEEE 802.11 family of protocols, to provide clients wireless access to network services. In accessing network services, clients can be configured to respond to beacons broadcast by corresponding access points. Specifically, a client can be in range of transmissions made by an access point and subsequently respond to the transmissions by providing wireless responses that can be received by the access point.

In providing clients access to network services, the access point 402 and the neighbor access point 406 can wirelessly exchange data, e.g. data packets, with clients in range of the corresponding access point 402 and neighbor access point 406. Specifically, in the example network environment 400 shown in FIG. 4, the client 404 is in range of the access point 402 and the access point 402 can wirelessly exchange data with the client 404 to provide network service access to the client 404. The access points in the network environment 400, e.g. the access point 402, can be configured to decode received packets according to an RxSOP threshold of the access points. For example, the access point 402 can be configured to decode packets received from both the client 404 and the neighbor access point 406 if the power levels at which the packets are received are greater than an RxSOP threshold of the access point 402.

The dynamic RxSOP threshold control system 408 functions to dynamically control RxSOP thresholds of access points, e.g. the access point 402, in the network environment 400. In dynamically controlling an RxSOP threshold of the access point 402, the dynamic RxSOP threshold control system 408 can determine an RxSOP threshold, e.g. a current RxSOP threshold ($cur_{RxSOP}$), of the access point 402 for providing network service access to clients, including the client 404. A current RxSOP threshold is an RxSOP threshold that the access point 402 is currently operating at to provide network service access.

A current RxSOP threshold can be an RxSOP threshold that is set at the startup of operation of the access point 402. For example, a current RxSOP can be a default, e.g. vendor-provided, RxSOP threshold of the access point 402. Further, a current RxSOP threshold can be an RxSOP threshold that is set/modulated to replace a previously established RxSOP threshold of the access point 402. For example, the dynamic RxSOP threshold control system 408 can reset an RxSOP threshold of the access point 402, e.g. a current RxSOP threshold ($cur_{RxSOP}$), to create a new current RxSOP threshold of the access point 402. Further in the example, and as will be discussed in greater detail later, the current RxSOP threshold of the access point 402 can be updated based on a target RxSOP threshold calculated according to the methods described herein to create a new current RxSOP threshold of the access point 402.

In dynamically controlling an RxSOP threshold of the access point 402, the dynamic RxSOP threshold control system 408 can identify wireless characteristics of clients, e.g. the client 404, associated with the access point 402. Clients associated with the access point 402 can include clients that are in range of the access point 402, e.g. clients that are currently accessing network services through the access point 402 and clients that are capable of accessing network services through the access point 402. Further, in dynamically controlling an RxSOP threshold of the access point 402, the dynamic RxSOP threshold control system 408 can identify wireless characteristics of access points, e.g. the neighbor access point 406, associated with the access point 402. Access points associated with the access point 402 can include access points that are in range of the access point 402, e.g. access points that can send transmissions to and/or receive transmission from the access point 402.

Wireless characteristics of clients associated with the access point 402 can include applicable characteristics of clients and the access point 402 in providing network services to and receiving network service access from the access point 402. For example, wireless characteristics of clients associated with the access point 402 can include a vendor provided RxSOP threshold of the access point 402 ($default_{RxSOP}$), the current RxSOP threshold of the access point 402 ($cur_{RxSOP}$), a current transmission power of the access point 402 ($tx_{cur}$), and a maximum allowable transmission power of the access point 402 ($tx_{max}$) on a specific channel of the access point 402. Further, wireless characteristics of access points associated with the access point 402 can include applicable characteristics of associated access points, e.g. neighboring access points, in providing network services from the access points. For example, wireless characteristics of access points associated with the access point 402 can include a list of all neighboring transmission access points (tx_neighbor), e.g. neighbor access point 406, that can detect the access point's 402 transmissions, a list of all neighboring reception access points (rx_neighbor) that can be detected by the access point 402, and a list of received signal strengths (RSSIs) of each neighboring access point ($rx\_neighbor_{rssi}$).

Based on the identified wireless characteristics of clients and access points associated with the access point 402, the dynamic RxSOP threshold control system 408 can dynamically modulate a current RxSOP threshold of the access point 402. For example, the dynamic RxSOP threshold control system 408 can modify the RxSOP threshold of the access point 402 based on transmission power of the client 404 accessing or attempting to access network services through the access point 402. In dynamically modulating an RxSOP threshold of the access point 402, the dynamic RxSOP threshold control system 408 can continue to update the RxSOP threshold during operation of the access point 402. For example, the dynamic RxSOP threshold control system 408 can modify the current RxSOP threshold of the access point 402 to a first value and then modulate the current RxSOP threshold from the first value to a second value.

The dynamic RxSOP threshold control system 408 can dynamically modulate the RxSOP threshold of the access point 402 based on a target RxSOP threshold of the access point 402 ($target_{RxSOP}$). Specifically, the dynamic RxSOP threshold control system 408 can set a target RxSOP threshold of the access point 402. As follows, the dynamic RxSOP threshold control system 408 can dynamically modulate the RxSOP threshold of the access point 402 based on the target RxSOP threshold set by the dynamic RxSOP threshold control system 408. For example and as will be discussed in greater detail later, the dynamic RxSOP threshold control system 408 can iteratively increase a current RxSOP threshold of the access point to a target RxSOP threshold, as identified by the dynamic RxSOP threshold control system 408.

The dynamic RxSOP threshold control system 408 can set a target RxSOP threshold of the access point 402 in order to increase the RxSOP threshold, e.g. to a highest allowable level. For example, the dynamic RxSOP threshold control system 408 can set a target RxSOP threshold of the access point 402 to ultimately increase or otherwise maximize throughput performance within the network environment 400. Further in the example, the dynamic RxSOP threshold control system 408 can iteratively increase the target RxSOP threshold of the access point 402 to a highest allowable level to maximize throughput performance without degrading access to services provided through the network environment 400.

In setting a target RxSOP threshold, the dynamic RxSOP threshold control system 408 can set the target RxSOP threshold of the access point 402 at an increased/highest level while still accounting for in range clients' abilities to communicate with the access point 402 for accessing network services. For example, and as will be discussed in greater detail later, the dynamic RxSOP threshold control system 408 can set a target RxSOP threshold at an increased level while still allowing the access point 402 to hear transmissions from clients within range of the access point 402. This can overcome the previously described issues that arise when an RxSOP threshold of an access point is increased to the point where the access point can no longer hear transmissions from clients within range of the access point. Additionally, the dynamic RxSOP threshold control system 408 can set a target RxSOP threshold of the access point 402 at an increased/highest level while still accounting for neighboring access points, e.g. the neighbor access point 406, operating to provide network services. For example, and as will be discussed in greater detail later, the dynamic RxSOP threshold control system 408 can set a target RxSOP threshold at an increased level while still allowing the access point 402 to detect transmissions from neighboring access points, e.g. the neighbor access point 406. This can overcome the previously described problems created through neighboring access point starvation caused by greatly increasing the RxSOP threshold of an access point.

In setting a target RxSOP threshold of the access point 402 based on client service access, the dynamic RxSOP threshold control system 408 can identify a client RxSOP threshold limit ($self_{lim}$) for the access point 402. As follows, the dynamic RxSOP threshold control system 408 can set a target RxSOP threshold of the access point 402 based on the identified client RxSOP threshold limit. A client RxSOP threshold limit, as used herein, can include an RxSOP threshold limit at which an access point can hear client transmissions from in range client devices. For example, a client RxSOP threshold limit can include an RxSOP threshold limit at which an access point can hear transmissions from in range clients made in response to beacons/transmissions made by the access point.

The dynamic RxSOP threshold control system 408 can select a client RxSOP threshold limit to match a client transmission range of an access point with a client reception range of the access point such that the access point can hear client transmissions from in range clients. In particular, the dynamic RxSOP threshold control system 408 can identify a client RxSOP threshold limit, as shown in Equation 1, based on a current transmission power and a maximum allowable transmission power.

$$\text{self}_{lim} = [tx_{max} - tx_{cur}] \quad \text{Equation 1}$$

Setting a client RxSOP threshold limit based on the difference between the maximum allowable transmission power of an access point and the current transmission power of the access point, can serve to match a transmission range of the access point with a reception range of the access point. As follows, this can ensure that the access point is capable of hearing transmissions from all or a portion of clients within range of the access point.

Further, in setting a target RxSOP threshold of the access point 402 based on neighboring access points, the dynamic RxSOP threshold control system 408 can identify a neighbor AP RxSOP threshold limit (neighbor$_{lim}$) of the access point 402. As follows, the dynamic RxSOP threshold control system 408 can set a target RxSOP threshold of the access point 402 based on the identified neighbor AP RxSOP threshold limit. A neighbor AP RxSOP threshold limit, as used herein, can include an RxSOP threshold limit at which an access point can hear transmissions from neighboring access points. For example, a neighbor AP RxSOP threshold limit can include an RxSOP threshold limit at which an access point can hear transmissions from neighboring access points made at varying data rates.

The dynamic RxSOP threshold control system 408 can select a neighbor AP RxSOP threshold limit based on a list of RSSIs of signals received from neighboring access points, e.g. the neighbor access point 406. In particular, the dynamic RxSOP threshold control system 408 can identify a neighbor AP RxSOP threshold limit, as shown in Equation 2, based on minimum received signal strengths of signals received from one or more neighboring access points.

$$\text{neighbor}_{lim} = [\min_{tx\_neighbor}(0, \text{neighbor}_{rssi}(i) - \min\text{NeighborRssiGap})] \quad \text{Equation 2}$$

As shown in Equation 2, the difference between the RSSIs of transmissions received from one or more neighboring access points and a minimum RSSI gap (minNeighborRssiGap) between the transmissions is calculated. The minimum RSSI gap can be a preset and/or constant value that is applied. For example, the minimum RSSI gap can be a constant 10 dB value that is determined empirically from experimental evaluation. As follows, the resultant minimum difference between the minimum RSSI gap and the RSSIs of transmissions received from neighboring access points can form the neighbor AP RxSOP threshold limit. This can ensure that the access point is capable of hearing transmissions from neighboring access points, thereby limiting the chances that a neighboring access point becomes starved.

The dynamic RxSOP threshold control system 408 can set a target RxSOP threshold of the access point 402 based on both the client RxSOP threshold limit and the neighbor AP RxSOP threshold limit identified for the access point 402. The dynamic RxSOP threshold control system 408 can also set a target RxSOP threshold of the access point 402 based on a default RxSOP threshold of the access point 402. Specifically, the dynamic RxSOP threshold control system 408 can set a target RxSOP threshold of the access point 402 according to Equation 3.

$$\text{target}_{RxSOP} = \text{default}_{RxSOP} + \min[\text{self}_{lim}, \text{neighbor}_{lim}] \quad \text{Equation 3}$$

In particular, the minimum of both the client RxSOP threshold limit and the neighbor AP RxSOP threshold can be added to the default RxSOP threshold of the access point 402 to identify a target RxSOP threshold for the access point 402. As shown in Equation 3, the target RxSOP threshold is calculated based on both the neighbor AP RxSOP threshold limit and the client RxSOP threshold limit. This ensures that when the target RxSOP threshold is used to set the current RxSOP threshold, the access point 402 can hear transmission from both clients within range of the access point 402 and neighboring access points, e.g. the neighbor access point 406, to the access point 402. In turn, this can help in solving the previously described problems created by modulating an RxSOP threshold of an access point, e.g. setting the RxSOP threshold excessively high.

The dynamic RxSOP threshold control system 408 can use the identified target RxSOP threshold of the access point 402 to dynamically modulate the RxSOP threshold of the access point 402. Specifically, the dynamic RxSOP threshold control system 408 can modulate the RxSOP threshold of the access point 402 based on the target RxSOP threshold of the access point 402 with respect to the current RxSOP threshold of the access point 402. More specifically, if the target RxSOP threshold is less than the current RxSOP threshold of the access point 402, then the dynamic RxSOP threshold control system 408 can set the current RxSOP threshold of the access point 402 to the identified target RxSOP threshold, thereby dynamically modulating the RxSOP threshold of the access point 402. For example, if the target RxSOP threshold is 70 dB and the access point 402 is operating at an RxSOP threshold of 80 dB, then the dynamic RxSOP threshold control system 408 can lower the RxSOP threshold of the access point 402 to 70 db.

Alternatively, if the target RxSOP threshold of the access point 402 is greater than the current RxSOP threshold of the access point 402, then the dynamic RxSOP threshold control system 408 can refrain from simply changing the current RxSOP threshold of the access point 402 to the target RxSOP threshold. Instead, the dynamic RxSOP threshold control system 408 can gradually increase the current RxSOP threshold of the access point 402 towards the target RxSOP threshold, e.g. through step increasing. This is shown in Equation 4, where the result$_{RxSOP}$ is the RxSOP of the access point as it is modulated and increased towards the target RxSOP threshold.

$$\text{result}_{RxSOP} = \min(\text{target}_{RxSOP}, \text{cur}_{RxSOP} + \text{STEP\_INCREASE}) \quad \text{Equation 4}$$

The gradual increasing towards the target RxSOP threshold is introduced when the target RxSOP threshold is greater than the current RxSOP threshold to avoid sudden changes to the prevailing RF environment as a result of changing the RxSOP threshold. Specifically, gradually increasing resultRxSOP in multiple steps can help in maintaining stability of the network environment 400.

The process of identifying the target RxSOP threshold and modulating the RxSOP threshold of the access point 402 can be performed by the dynamic RxSOP threshold control system 408 periodically. Specifically, as wireless characteristics of clients and neighboring access points associated with the access point 402 change over time, the dynamic RxSOP threshold control system 408 can update/recalculate the target RxSOP threshold. In turn, the dynamic RxSOP threshold control system 408 can update the current RxSOP threshold of the access point 402 using the updated target RxSOP threshold to account for changes in the network environment 400.

The dynamic RxSOP threshold control system 408 can be implemented at the access point 402. In turn, the access point 402 can perform the functionalities for modulating its own RxSOP threshold based on wireless characteristics of clients and access points associated with the access point 402. Further, the functionalities of the dynamic RxSOP threshold control system 408 can be distributed to each access point in the network environment 400. In turn, each of the access points in the network environment 400 can each dynamically modulate their own RxSOP thresholds according to the techniques described herein. Alternatively, the dynamic RxSOP threshold control system 408 can be implemented remote from the network environment 400, e.g. in a cloud environment.

FIG. 5 illustrates a flowchart for an example method of dynamically modulating an RxSOP threshold of an access point based on wireless characteristics of clients and access points associated with the access point. The method shown in FIG. 5 is provided by way of example, as there are a variety of ways to carry out the method. Additionally, while the example method is illustrated with a particular order of steps, those of ordinary skill in the art will appreciate that FIG. 5 and the modules shown therein can be executed in any order and can include fewer or more modules than illustrated.

Each module shown in FIG. 5 represents one or more steps, processes, methods or routines in the method. For the sake of clarity and explanation purposes, the modules in FIG. 5 are described with reference to the environment 400 shown in FIG. 4.

At step 500, the dynamic RxSOP threshold control system 408 determines a current RxSOP threshold of the access point 402 in the network environment 400. The current RxSOP threshold of the access point 402 can be a vendor-provided default RxSOP threshold of the access point 402. Alternatively, the RxSOP threshold of the access point 402 can be a current RxSOP threshold that is set based on a target RxSOP threshold calculated according to the techniques described herein.

At step 502, the dynamic RxSOP threshold control system 408 identifies wireless characteristics of one or more clients and access points associated with the access point 402 in the network environment. Specifically, the dynamic RxSOP threshold control system 408 can identify wireless characteristics of one or more clients in accessing network services through the access point 402 in the network environment 400. Further, the dynamic RxSOP threshold control system 408 can identify wireless characteristics of one or more neighboring access points to the access point 402 in providing access to network services through the network environment 400.

At step 504, the dynamic RxSOP threshold control system 408 dynamically modulates the current RxSOP threshold of the access point 402 based on the wireless characteristics of the one or more clients and the access points associated with the access point 402. Specifically, the dynamic RxSOP threshold control system 408 can set a target RxSOP threshold based on the wireless characteristics. Subsequently, the dynamic RxSOP threshold control system 408 can modulate the current RxSOP threshold of the access point 402 based on the target RxSOP threshold identified from the wireless characteristics.

The disclosure now turns to FIGS. 6 and 7, which illustrate example network devices and computing devices, such as switches, routers, load balancers, client devices, and so forth.

FIG. 6 illustrates a computing system architecture 600 wherein the components of the system are in electrical communication with each other using a connection 605, such as a bus. Exemplary system 600 includes a processing unit (CPU or processor) 610 and a system connection 605 that couples various system components including the system memory 615, such as read only memory (ROM) 620 and random access memory (RAM) 625, to the processor 610.

The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware or software service, such as service 1 632, service 2 634, and service 3 636 stored in storage device 630, configured to control the processor 610 as well as a special-purpose processor where software instructions are incorporated into the actual processor design. The processor 610 may be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include services 632, 634, 636 for controlling the processor 610. Other hardware or software modules are contemplated. The storage device 630 can be connected to the system connection 605. In one aspect, a hardware module that performs a particular function can include the software component stored in a computer-readable medium in connection with the necessary hardware components, such as the processor 610, connection 605, output device 635, and so forth, to carry out the function.

FIG. 7 illustrates an example network device 700 suitable for performing switching, routing, load balancing, and other networking operations. Network device 700 includes a central processing unit (CPU) 704, interfaces 702, and a bus 710 (e.g., a PCI bus). When acting under the control of appropriate software or firmware, the CPU 704 is responsible for executing packet management, error detection, and/or routing functions. The CPU 704 preferably accomplishes all these functions under the control of software including an operating system and any appropriate applications software. CPU 704 may include one or more processors 708, such as a processor from the INTEL X86 family of microprocessors. In some cases, processor 708 can be specially designed hardware for controlling the operations of network device 700. In some cases, a memory 706 (e.g., non-volatile RAM, ROM, etc.) also forms part of CPU 704. However, there are many different ways in which memory could be coupled to the system.

The interfaces 702 are typically provided as modular interface cards (sometimes referred to as "line cards"). Generally, they control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 704 to efficiently perform routing computations, network diagnostics, security functions, etc.

Although the system shown in FIG. 7 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 700.

Regardless of the network device's configuration, it may employ one or more memories or memory modules (including memory 706) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 706 could also hold various software containers and virtualized execution environments and data.

The network device 700 can also include an application-specific integrated circuit (ASIC), which can be configured to perform routing and/or switching operations. The ASIC can communicate with other components in the network device 700 via the bus 710, to exchange data and signals and coordinate various types of operations by the network device 700, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of refers to at least one of a set and indicates that one member of the set or multiple members of the set satisfy the claim. For example, claim language reciting "at least one of A and B" means A, B, or A and B.

What is claimed is:
1. A method comprising:
  determining a current receiver start-of-packets (RxSOP) threshold of an access point of a plurality of access points in a network environment providing wireless access to network services;
  identifying wireless characteristics of one or more clients and the plurality of access points associated with the access point in wirelessly providing and accessing the network services through the network environment; and dynamically modulating the current RxSOP threshold of the access point based on the wireless characteristics of the one or more clients and the plurality of access points.

2. The method of claim 1, further comprising iteratively increasing the current RxSOP threshold based on the wireless characteristics of the one or more clients and the plurality of access points.

3. The method of claim 1, further comprising:
setting a target RxSOP threshold based on the wireless characteristics of the one or more clients and the plurality of access points; and
dynamically modulating the current RxSOP threshold of the access point based on the target RxSOP threshold.

4. The method of claim 3, further comprising:
identifying one or more of a vendor provided RxSOP threshold of the access point, the current RxSOP threshold of the access point, a current transmission power of the access point, a maximum allowable transmission power of the access point on a specific channel of the access point, a list of all neighboring transmission access points of the plurality of access points that can detect the access point's transmissions, a list of all neighboring reception access points of the plurality of access points that can be detected by the access point, and a list of received signal strengths (RSSIs) of each neighboring access point of the plurality of access points, as part of identifying the wireless characteristics of the plurality of access points in wireless providing the network services through the network environment; and
setting the target RxSOP threshold based on one or more of the vendor provided RxSOP threshold of the access point, the current RxSOP threshold of the access point, the current transmission power of the access point, the maximum allowable transmission power of the access point on the specific channel of the access point, the list of all neighboring transmission access points of the plurality of access points that can detect the access point's transmissions, the list of all neighboring reception access points of the plurality of access points that can be detected by the access point, and the list of RSSIs of each neighboring access point of the plurality of access points.

5. The method of claim 4, further comprising:
identifying a client RxSOP threshold limit at which the access point can hear client transmissions from one or more client devices in response to access point transmissions from the access point; and
setting the target RxSOP threshold based on a default RxSOP threshold and the client RxSOP threshold limit.

6. The method of claim 5, wherein the client RxSOP threshold limit is selected to match a client transmission range of the access point with a client reception range of the access point such that the access point can hear the client transmissions from the one or more client devices in response to the access point transmissions from the access point.

7. The method of claim 5, further comprising:
identifying a neighbor AP RxSOP threshold limit at which the access point can hear transmissions from neighboring access points of the plurality of access points; and
setting the target RxSOP threshold based on the default RxSOP threshold, the client RxSOP threshold limit and the neighbor AP RxSOP threshold limit.

8. The method of claim 7, wherein the neighbor AP RxSOP threshold limit is selected to allow the access point to hear the transmissions made from the neighboring access points at varying data rates.

9. The method of claim 5, wherein the default RxSOP threshold is the vendor provided RxSOP threshold of the access point.

10. The method of claim 5, wherein the current RxSOP threshold of the access point is set to the default RxSOP threshold.

11. The method of claim 3, further comprising:
determining whether the current RxSOP threshold of the access point is greater or less than the target RxSOP threshold; and
setting the current RxSOP threshold of the access point to the target RxSOP threshold if the current RxSOP threshold is greater than the target RxSOP threshold.

12. The method of claim 11, further comprising gradually increasing the current RxSOP threshold of the access point to the target RxSOP threshold if the current RxSOP threshold is less than the target RxSOP threshold.

13. The method of claim 3, further comprising:
periodically updating the target RxSOP threshold based on the wireless characteristics of the one or more clients and the plurality of access points associated with the access point as the wireless characteristics change over time; and
dynamically modulating the current RxSOP threshold of the access point based on the target RxSOP threshold as the target RxSOP threshold is periodically updated over time.

14. The method of claim 1, wherein functionalities of one or a combination of setting the RxSOP threshold of the access point, identifying the wireless characteristics of the one or more clients and the plurality of access points associated with the access point, and dynamically modulating the current RxSOP threshold of the access point based on the wireless characteristics of the one or more clients and the plurality of access points associated with the access point are performed at the access point.

15. A system comprising:
one or more processors; and
at least one computer-readable storage medium having stored therein instructions which, when executed by the one or more processors, cause the one or more processors to perform operations comprising:
determining a current receiver start-of-packets (RxSOP) threshold of an access point of a plurality of access points in a network environment providing wireless access to network services;
identifying wireless characteristics of one or more clients and the plurality of access points associated with the access point in wirelessly providing and accessing the network services through the network environment;
setting a target RxSOP threshold of the access point based on the wireless characteristics of the one or more clients and the plurality of access points; and
dynamically modulating the current RxSOP threshold of the access point based on the target RxSOP threshold.

16. The system of claim 15, wherein the instructions which, when executed by the one or more processors, further cause the one or more processors to perform operations comprising:
identifying one or more of a vendor provided RxSOP threshold of the access point, the current RxSOP threshold of the access point, a current transmission power of the access point, a maximum allowable transmission power of the access point on a specific channel of the access point, a list of all neighboring transmission access points of the plurality of access points that can detect the access point's transmissions, a list of all neighboring reception access points of the plurality of access points that can be detected by the access point, and a list of received signal strengths (RSSIs) of each neighboring access point of the plurality of access points, as part of identifying the wireless characteristics of the plurality of access points in wireless providing the network services through the network environment; and setting the target RxSOP threshold based on one or more of the vendor provided RxSOP threshold of the access point, the current RxSOP threshold of the access point, the current transmission power of the access point, the maximum allowable transmission power of the access point on the specific channel of the access point, the list of all neighboring transmission access points of the plurality of access points that can detect the access point's transmissions, the list of all neighboring reception access points of the plurality of access points that can be detected by the access point, and the list of RSSIs of each neighboring access point of the plurality of access points.

17. The system of claim 16, wherein the instructions which, when executed by the one or more processors, further cause the one or more processors to perform operations comprising:
identifying a client RxSOP threshold limit at which the access point can hear client transmissions from one or more client devices in response to access point transmissions from the access point; and
setting the target RxSOP threshold based on a default RxSOP threshold and the client RxSOP threshold limit.

18. The system of claim 17, wherein the instructions which, when executed by the one or more processors, further cause the one or more processors to perform operations comprising:
identifying a neighbor AP RxSOP threshold limit at which the access point can hear transmissions from neighboring access points of the plurality of access points; and
setting the target RxSOP threshold based on the default RxSOP threshold, the client RxSOP threshold limit and the neighbor AP RxSOP threshold limit.

19. The system of claim 15, wherein the instructions which, when executed by the one or more processors, further cause the one or more processors to perform operations comprising:
determining whether the current RxSOP threshold of the access point is greater or less than the target RxSOP threshold; and
setting the current RxSOP threshold of the access point based on if the current RxSOP threshold is greater or less than the target RxSOP threshold.

20. A non-transitory computer-readable storage medium having stored therein instructions which, when executed by a processor, cause the processor to perform operations comprising:
determining a current receiver start-of-packets (RxSOP) threshold of an access point of a plurality of access points in a network environment providing wireless access to network services;
identifying, by the access point, wireless characteristics of one or more clients and the plurality of access points associated with the access point in wirelessly providing and accessing the network services through the network environment; and
dynamically modulating, by the access point, the current RxSOP threshold of the access point based on the wireless characteristics of the one or more clients and the plurality of access points.

* * * * *